United States Patent
Hausler et al.

(10) Patent No.: US 9,597,934 B2
(45) Date of Patent: Mar. 21, 2017

(54) TRUCK BOX WITH FIFTH WHEEL CROSS MEMBER

(75) Inventors: Henry W. Hausler, Manchester, MI (US); Corey John Jarocki, Harrison Township, MI (US); Joseph L. Buchwitz, Huntington Woods, MI (US); Andrew Kammerzell, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 771 days.

(21) Appl. No.: 13/468,338

(22) Filed: May 10, 2012

(65) Prior Publication Data

US 2013/0300087 A1    Nov. 14, 2013

(51) Int. Cl.
*B60D 1/14* (2006.01)
*B60D 1/01* (2006.01)
*B60D 1/48* (2006.01)

(52) U.S. Cl.
CPC .............. *B60D 1/015* (2013.01); *B60D 1/488* (2013.01); *Y10T 29/49622* (2015.01)

(58) Field of Classification Search
CPC .... B60D 1/015; B60D 1/488; Y10T 29/49622
USPC ... 280/496, 425.2, 476.1, 415.1, 417.1, 495, 280/491.5
See application file for complete search history.

(56) References Cited

U.S. PATENT DOCUMENTS

| | | | |
|---|---|---|---|
| 3,715,001 A * | 2/1973 | Wilson | 180/68.4 |
| 4,279,430 A | 7/1981 | Tagg et al. | |
| 5,022,573 A | 6/1991 | Barkouskie | |
| 6,158,761 A * | 12/2000 | King | 280/495 |
| 6,805,379 B2 * | 10/2004 | Nommensen | 280/781 |
| 6,824,157 B1 * | 11/2004 | Putnam | 280/491.1 |
| 7,793,968 B1 | 9/2010 | Withers | |
| 7,828,317 B2 | 11/2010 | Withers et al. | |
| 8,215,658 B2 * | 7/2012 | Stanifer et al. | 280/491.5 |
| 2002/0157885 A1 * | 10/2002 | Brown | 180/68.4 |
| 2006/0062657 A1 * | 3/2006 | Davis et al. | 414/462 |
| 2009/0085326 A1 * | 4/2009 | Linger et al. | 280/433 |
| 2010/0313422 A1 | 12/2010 | Booher | |

FOREIGN PATENT DOCUMENTS

EP       0547010       6/1993

\* cited by examiner

*Primary Examiner* — Kevin Hurley
*Assistant Examiner* — Marlon A Arce
(74) *Attorney, Agent, or Firm* — Jason C. Rogers; Brooks Kushman P.C.

(57) ABSTRACT

An integral fifth wheel cross member assembly for a pick-up truck bed. The fifth wheel cross member assembly is secured to the left and right frame rails between two intermediate cross members. The box is attached to the frame with the fifth wheel cross member already in place.

9 Claims, 1 Drawing Sheet

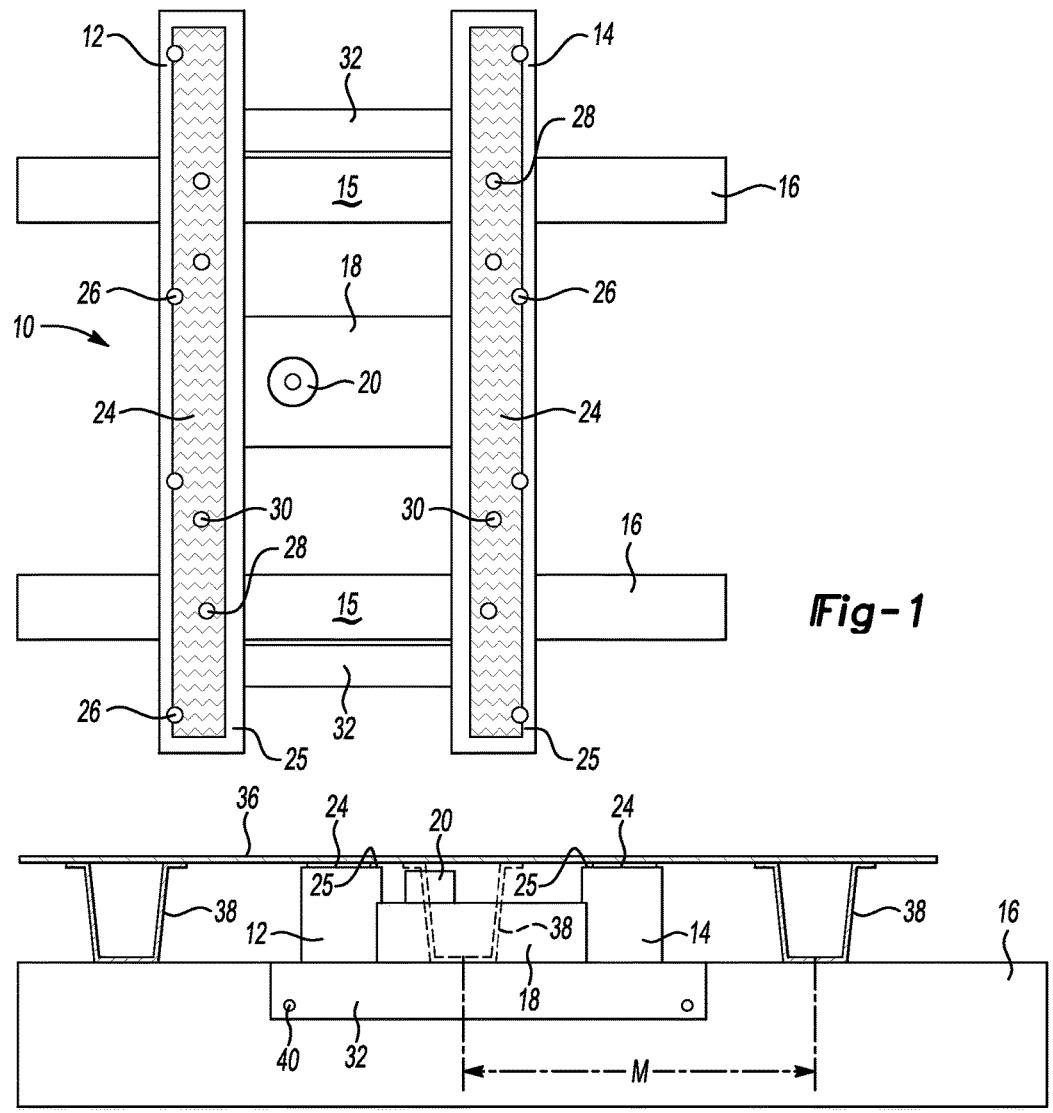
Fig-1
Fig-2
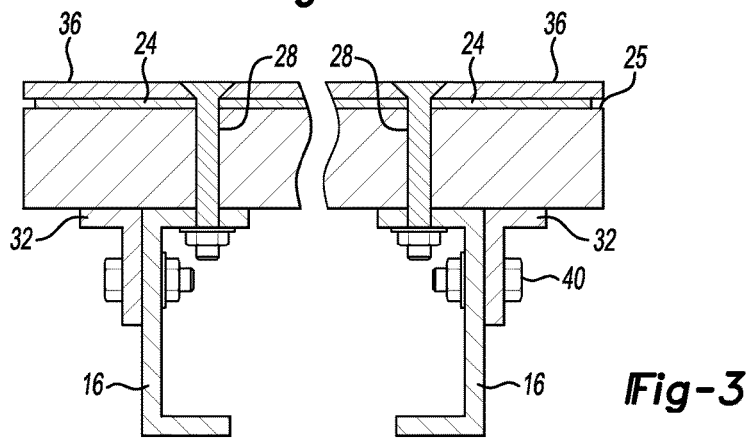
Fig-3

TRUCK BOX WITH FIFTH WHEEL CROSS MEMBER

TECHNICAL FIELD

This disclosure relates to truck box supports and fifth wheel cross members that support the truck box floor pan.

BACKGROUND

Pick-up trucks may include a cross member that supports a fifth wheel trailer hitch that is located below the bed of the truck as an optional feature. One problem relating to offering a fifth wheel hitch is that the cross member and hitch add weight to the vehicle. Another problem is that the cross member and hitch is a relatively large assembly that is difficult to package under the bed of the pick-up truck. This problem becomes more prevalent as the weight of the box is reduced and the box floor becomes more sensitive to box cross member spacing. Since the cross member and hitch are an optional accessory package for a pick-up truck that is not normally sold with the cross member and hitch, providing a cost and weight effective option requires minimizing reconfiguration of the basic truck to provide the optional accessory.

This disclosure is directed to addressing the above problems and other problems as summarized below.

SUMMARY

According to one aspect of this disclosure, pick-up truck is provided that comprises a frame including a pair of frame rails, a plurality of cross members secured to the frame rails, a truck bed supported on the cross members, and a fifth wheel cross member secured to the frame rails and supporting the truck bed between two widely spaced cross members.

According to other aspects of the disclosure as it relates to the pick-up truck apparatus, the fifth wheel cross member may further comprise a front box beam and a rear box beam that are secured to the top of each of the frame rails, a bridging beam is attached between the front box beam and the rear box beam, and a gooseneck ball receiver is secured to a top of the bridging beam. A first and second isolator pad may be attached to a top surface of each of the front box beam and the rear box beam underneath the truck bed. The front and the rear box beams may be fastened to the frame rails.

According to still further aspects of the disclosure as it relates to a pick-up truck, a plurality of cross members are attached to the frame rails at spaced intervals. The spacing between the cross members is limited to a maximum spacing in a longitudinal direction of 50 centimeters except for the spacing between a first and a second intermediate cross members that are spaced apart by more than the maximum spacing. The fifth wheel cross member assembly may be fastened to the frame rails between the first and second intermediate cross members.

According to another aspect of this disclosure, a method is disclosed for manufacturing a pick-up truck. The method comprises attaching a plurality of cross members to the truck bed frame rails at spaced intervals. The spacing between the cross members is limited to a maximum spacing in direction of 50 centimeters except for the spacing between two intermediate cross members that are adjacent to the location where the fifth wheel cross member assembly is attached to the frame. The spacing between the two intermediate cross members is greater than the maximum spacing. A fifth wheel cross member assembly is attached to the frame rails between the intermediate cross members and to the truck bed.

According to other aspects of the disclosure as it relates to the method, the fifth wheel cross member assembly may include a front box beam and a rear box beam that are secured to the top of each of the frame rails, a bridging beam is attached between the front box beam and the rear box beam, and a gooseneck ball receiver secured to a top of the bridging beam. The method may further comprise attaching a first and a second isolator pad to the front box beam and the rear box beam between a top surface of the front and rear box beams and the truck bed.

The step of attaching the fifth wheel cross member to the frame rails may further comprise fastening the front and the rear box beams to the frame rails. The method may also comprise fastening a fifth wheel receiver to the truck bed and the front and rear box rails at a location that is either inboard or outboard of the frame rails.

According to another aspect of this disclosure, a fifth wheel cross member assembly is provided for a pick-up truck that has a frame including a pair of frame rails, a plurality of cross members secured to the pair of frame rails, and a truck bed supported on the cross members. The fifth wheel cross member assembly is secured to the frame rails and supports the truck bed between two of the cross members. The fifth wheel cross member assembly includes a front box beam and a rear box beam that are secured to the frame, a bridging beam attached between the front box beam and the rear box beam, and a gooseneck ball receiver receptacle secured to a top of the bridging beam.

According to further aspects of the disclosure, the fifth wheel cross member assembly may include a first isolator pad and a second isolator pad that are attached to a top surface of each of the front box beam and the rear box beam underneath the truck bed. The front and the rear box beams may be fastened to a top surface of the frame rails. The cross members may be attached to the frame rails at spaced intervals with the spacing between the cross members being limited to a maximum spacing in a longitudinal direction. Two intermediate cross members are spaced apart by more than the maximum spacing to accommodate fastening the fifth wheel cross member assembly to the frame rails between the two intermediate cross members.

The above aspects of this disclosure and other aspects will be better understood in view of the attached drawings and the following detailed description of the illustrated embodiments.

BRIEF DESCRIPTION OF THE DRAWINGS

FIG. 1 is a top plan view of a fifth wheel cross member assembly;

FIG. 2 is a left side elevation view of the fifth wheel cross member assembly attached between a pick-up truck bed and a frame; and FIG. 3 is a rear elevation view of the fifth wheel cross member assembly.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Referring to FIG. 1, a fifth wheel cross member assembly 10 is shown to include a front box beam 12 and a rear box beam 14 that extend transversely relative to the vehicle direction and are secured to a top surface 15 of a pair of parallel frame rails 16 that form part of the frame of the vehicle. The illustrated frame rails 16 are open C-channels, but this disclosure is equally applicable to box-type frame rails. A bridging beam 18 is welded or otherwise connected between the front box beam 12 and the rear box beam 14. A gooseneck ball hitch receiver 20 is attached to the bridging beam 18. The gooseneck ball hitch receiver 20 is adapted to receive a gooseneck ball (not shown) that is adapted to receive a gooseneck hitch of a trailer.

Isolator pads 24 are provided on a top surface 25 of each of the front box beam 12 and the rear box beam 14. The isolator pads 24 are polymeric pads that function to reduce noise and vibration.

Fasteners 26 are used to connect the box (not shown in FIG. 1) to the fifth wheel cross member assembly 10. Fasteners 28 are used to connect the fifth wheel cross member assembly 10 to the frame at the frame rail 16. Fifth wheel pedestal receiver attachment receptacles 30 are provided on the front box beam 12 and rear box beam 14. As shown in FIG. 1, the receptacles 30 are provided inboard of the frame rail 16. However, it should be understood that the receptacles 30 could also be provided outboard of the frame rail 16.

Brackets 32 are shown in FIG. 1 to be secured to the outer side of the frame rail 16. The brackets 32 are L-shaped brackets that are secured by bracket fasteners 40 to the frame rail 16.

Referring to FIG. 2, a pick-up truck bed 36 that forms part of the pick-up truck box is shown supported by two cross members 38 and by the fifth wheel cross member assembly 10. The cross member, as identified by reference numeral 38, could also be referred to as an intermediate cross member and it should be understood that other cross members 38 may be provided in front of the front box beam 12 and rearward of the rear box beam 14. The spacing between the other cross members 38 is less than 50 centimeters and is generally less than the spacing between the two cross members 38 shown in FIG. 2.

The maximum spacing of the cross members 38 is represented by "M" in FIG. 2. The cross member 38 shown in phantom lines in FIG. 2 is normally provided on the truck bed 36 if the fifth wheel cross member assembly option is not provided. The distance "M" between adjacent cross members 38 is maximized to reduce vehicle weight. However, due to the size of the fifth wheel cross member, the cross member 38 shown in phantom lines in FIG. 2 is omitted. All of the other cross members 38, typically four or more, support the truck bed 36 in conjunction with the fifth wheel cross member assembly 10. The front and rear box beams 12 and 14 are secured to the truck bed 36 and provide reinforcement of the truck bed 36 in addition to supporting the gooseneck ball hitch receiver 20 and fifth wheel pedestal receiver attachment receptacles 30.

Referring to FIG. 3, a pair of frame rails 16 is shown supporting a rear box beam 14. The brackets 32 are secured to the frame rails 16 by bracket fasteners 40. Fasteners 28 may be provided that extend through the isolator pads 24 of the rear box beam 14 and the brackets 32.

According to the method disclosed for manufacturing a pick-up truck bed, a plurality of cross members 38 are initially attached to the truck bed 36 at spaced intervals. The spacing between the cross members 38 is limited to a maximum spacing in a longitudinal direction of 50 centimeters except for the location where the fifth wheel cross member assembly 10 is attached to the frame 16. The distance between the two cross members 38 in this location is greater than the maximum spacing and the fifth wheel cross member assembly 10 is attached to the frame rails 16 between the two intermediate cross members 38. The truck bed is then attached to the fifth wheel cross member assembly 10 after it is assembled to the frame rails.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pick-up truck comprising:
   a pair of frame rails;
   a plurality of cross members supporting a truck bed and secured to a top surface of each of the frame rails spaced apart by less than 50 centimeters in a longitudinal direction;
   a fifth wheel assembly secured to the frame rails and supporting the truck bed between two intermediate cross members that are longitudinally spaced by more than 50 centimeters.

2. The pick-up truck of claim 1 wherein the fifth wheel assembly further comprises a front box beam and a rear box beam that are secured to the top surface of each of the frame rails, a bridging beam attached between the front box beam and the rear box beam, and a gooseneck ball receiver receptacle secured to a top of the bridging beam.

3. The pick-up truck of claim 2 wherein a first and second isolator pad is attached to a top surface of each of the front box beam and the rear box beam beneath the truck bed.

4. The pick-up truck of claim 2 wherein the front and the rear box beams are fastened to a top surface of the frame rails.

5. A method of manufacturing a pick-up truck that has a right frame rail and a left frame rail, the method comprising:
   attaching a plurality of cross members to a top surface of each of the frame rails, wherein the spacing between the cross members is limited to less than 50 centimeters in a longitudinal direction except for the spacing between two intermediate cross members that are spaced apart by more than 50 centimeters;
   attaching a fifth wheel assembly to the frame rails between the two intermediate cross members; and
   assembling a truck bed to the fifth wheel assembly, the cross members and the two intermediate cross members.

6. The method of claim 5 wherein the fifth wheel assembly includes a front box beam and a rear box beam that are secured to the top surface of each of the frame rails, a bridging beam attached between the front box beam and the rear box beam, and a gooseneck ball receiver secured to a top of the bridging beam, the method further comprising:
   attaching a first and a second isolator pad to the front box beam and the rear box beam between a top surface of the front and rear box beams and the truck bed.

7. The method of claim 6 wherein the step of attaching the fifth wheel assembly to the frame rails further comprises fastening the front and the rear box beams to the frame rails.

8. The method of claim 6 further comprising fastening a fifth wheel receiver to the truck bed and the front and rear box rails.

9. The method of claim 8 wherein the fifth wheel receiver is fastened to the truck bed at a location that is spaced from the frame rails.

* * * * *